United States Patent
Lee et al.

(10) Patent No.: US 12,277,336 B2
(45) Date of Patent: Apr. 15, 2025

(54) APPARATUS AND METHOD FOR CONTROLLING A POOLED MEMORY DEVICE OR A MEMORY EXPANDER

(71) Applicant: SK hynix Inc., Gyeonggi-do (KR)

(72) Inventors: Ho Kyoon Lee, Gyeonggi-do (KR); Kwang Jin Ko, Gyeonggi-do (KR); Jun Hee Ryu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/173,085

(22) Filed: Feb. 23, 2023

(65) Prior Publication Data
US 2024/0126469 A1 Apr. 18, 2024

(30) Foreign Application Priority Data
Oct. 12, 2022 (KR) .................. 10-2022-0130643

(51) Int. Cl.
*G06F 3/06* (2006.01)
(52) U.S. Cl.
CPC .......... *G06F 3/0647* (2013.01); *G06F 3/0625* (2013.01); *G06F 3/0683* (2013.01)
(58) Field of Classification Search
CPC ..... G06F 3/0647; G06F 3/0625; G06F 3/0683
See application file for complete search history.

(56) References Cited

U.S. PATENT DOCUMENTS

| | | | |
|---|---|---|---|
| 10,936,039 B2 | 3/2021 | Guim Bernat et al. | |
| 2010/0017632 A1* | 1/2010 | Cooper | G06F 3/0625 711/E12.001 |
| 2011/0093726 A1* | 4/2011 | Worthington | G06F 1/3275 713/340 |
| 2016/0342333 A1* | 11/2016 | Wheeler | G06F 3/0647 |
| 2019/0041960 A1* | 2/2019 | Guim Bernat | H04L 41/5051 |
| 2020/0192715 A1 | 6/2020 | Wang et al. | |
| 2022/0004330 A1* | 1/2022 | Guim Bernat | G06F 3/0631 |
| 2023/0086149 A1* | 3/2023 | Kuo | G06F 1/3225 |
| 2023/0100573 A1* | 3/2023 | Jeong | G06F 3/0611 |

OTHER PUBLICATIONS

Jung, Myoungsoo. "Hello bytes, bye blocks: PCIe storage meets compute express link for memory expansion (CXL-SSD)." In Proceedings of the 14th ACM Workshop on Hot Topics in Storage and File Systems, pp. 45-51. 2022.*

* cited by examiner

*Primary Examiner* — Tracy A Warren
(74) *Attorney, Agent, or Firm* — IP & T GROUP LLP

(57) ABSTRACT

A pooled memory device includes plural memory devices and a controller. The plural memory devices include a first memory and a second memory with at least one power supply configured to control power supplied to each of the plural memory devices. The controller is coupled to an interconnect device which is configured to provide the plural memory devices to at least one external device as a logical device. The controller is configured to track available storage capacities of the first memory and the second memory and cut off power supplied to an unused memory among the first memory and the second memory.

17 Claims, 11 Drawing Sheets

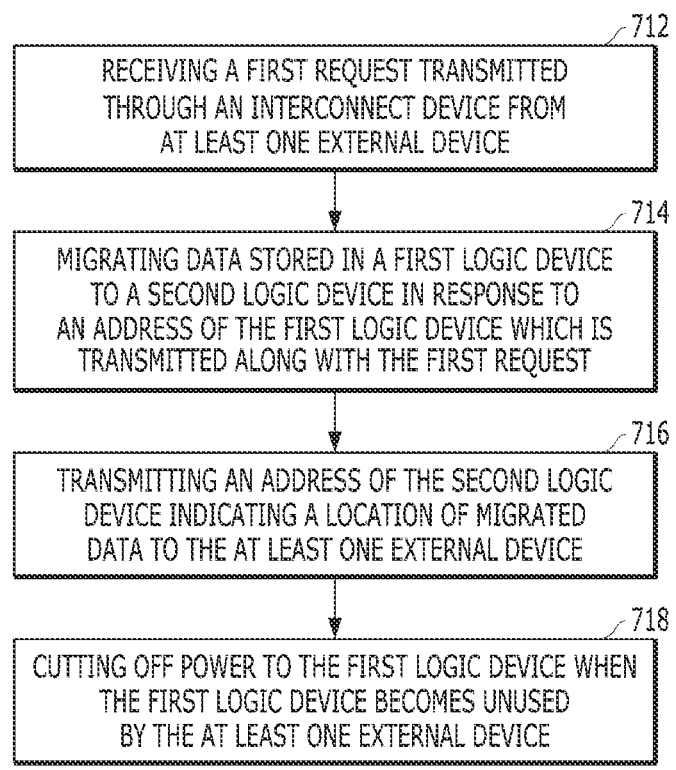

APPARATUS AND METHOD FOR CONTROLLING A POOLED MEMORY DEVICE OR A MEMORY EXPANDER

CROSS-REFERENCE TO RELATED APPLICATIONS

This patent application claims to the benefit of Korean Patent Application No. 10-2022-0130643, filed on Oct. 12, 2022, the entire disclosure of which is incorporated herein by reference.

TECHNICAL FIELD

One or more embodiments described in this disclosure relate to a memory system, and specifically, to an apparatus and a method for controlling a pooled memory device or a memory expander coupled to at least one computing device.

BACKGROUND

Computing systems are increasing an amount of computation in response to user's needs. Due to the increase in the amount of computation, an amount of data generated or stored is also increasing. While the amount of data increases, a space in which data can be stored is limited in a computing system. A memory expander or a pooled memory device may be provided to store a significant amount of data or avoid deterioration of computing power and performance of the computing system. The memory expander or the pooled memory device may be understood as a composable infrastructure to overcome resource limitations of the computing system. When the computing system, the memory expander, or the pooled memory device performs high-speed data communication, high-density workload operations generated from big data and machine learning could be supported.

BRIEF DESCRIPTION OF THE DRAWINGS

The description herein references the accompanying drawings where like reference numerals refer to like parts throughout the figures.

FIG. 11 illustrates a method for operating a memory expander according to another embodiment of the present disclosure.

DETAILED DESCRIPTION

Figure 1:
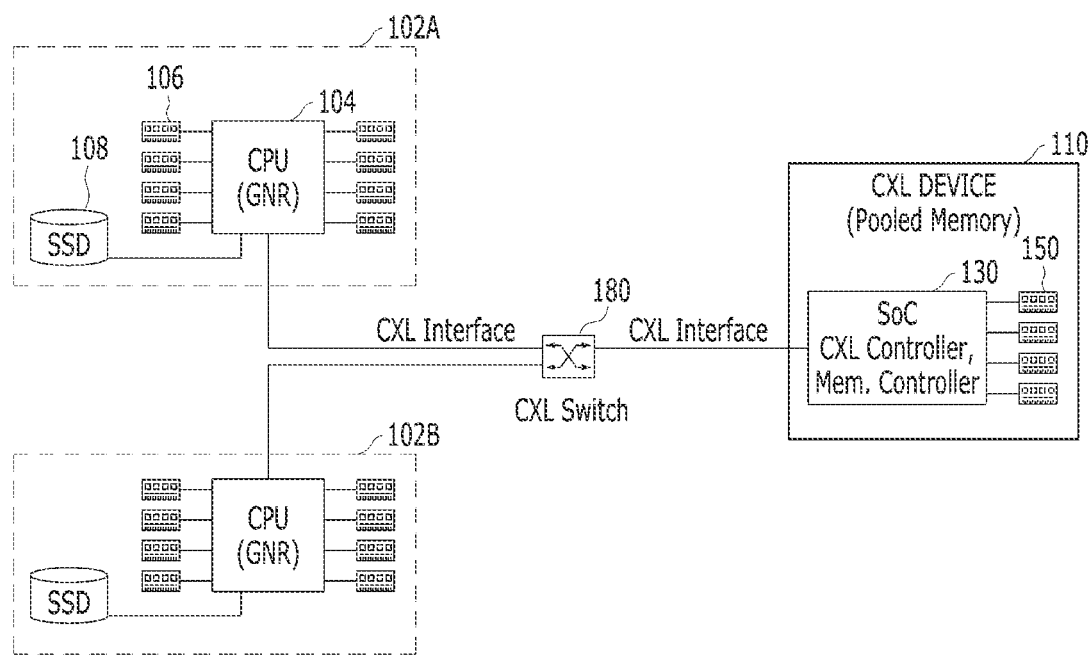
FIG. 1 illustrates a first example of data infrastructure according to an embodiment of the present disclosure.

Various embodiments of the disclosed technology are described with reference to the accompanying drawings. Elements and features of the disclosed technology, however, may be configured or arranged differently to form other embodiments, which may be variations of any of the disclosed embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

In this disclosure, the terms "comprise," "comprising," "include" and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

In an implementation of the present disclosure, the term 'circuitry' refers to at least one of the following: (a) hardware-only circuit implementations (such as implementations in only analog and/or digital circuitry), (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions), or (c) to circuits, such as a microprocessor(s) or a portion of a microprocessor(s), that require software or firmware for operation, even if the software or firmware is not physically present. This definition of 'circuitry' applies to all uses of this term in this application, including in any claims. In an implementation, the term "circuitry" also covers an implementation of merely a processor (or multiple processors) or portion of a processor and its (or their) accompanying software and/or firmware. The term "circuitry" also covers, for example, an integrated circuit for a storage device.

As used herein, terms which are used as labels for nouns that they precede do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Herein, an entry of data or a data entry may be a sequence of bits. For example, the data entry may include the contents of a file, a portion of the file, a page in memory, an object in an object-oriented program, a digital message, a digital scanned image, a part of a video or audio signal, or any other entity which can be represented by a sequence of bits. According to an embodiment, the data entry may include a discrete object. According to another embodiment, the data entry may include a unit of information within a transmission packet between two different components.

Also, the term "based on" may describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose determination of A from also being based on C. In other instances, A may be determined based solely on B.

Embodiments of the present disclosure can provide a memory expander, a pooled memory device, a memory system, a memory expansion device, a controller included in a pooled memory device or a memory system, or a data processing device including a memory expander, a pooled memory device, or a memory system. For example, an embodiment described in this disclosure can provide a data processing system including a memory expander or a pooled memory device and a method for operating the data processing system. The data processing system can include components and resources such as a memory system and a host. The data processing system can include an apparatus for improving data input/output operation performance between the components based on usages of the components and the resources.

According to an embodiment of the present disclosure, a pooled memory device can include plural memory devices including a first memory and a second memory with at least one power supply configured to control power supplied to each of the plural memory devices; and a controller coupled to an interconnect device configured to provide, to at least one external device, the plural memory devices as logical devices, the controller configured to track available memory capacities of the first memory and the second memory and cut off power supplied to an unused memory among the first memory and the second memory.

The controller can be configured to, in response to a first request input from the at least one external device, migrate data from the first memory to the second memory and cut off the power supplied to the first memory.

The first request can include an address or an identifier indicating the first memory or the second memory.

The controller can be further configured to notify, after migrating the data to the second memory, the at least one external device of a location in which the migrated data is stored in the second memory.

The controller can be further configured to block a notification of the cut-off of the power supplied to the unused memory when the power supplied to the unused memory is cut off without a first request input from the at least one external device.

The first memory and the second memory can be allocated for storing data associated with different logical address ranges used for the logical devices.

The controller can be further configured to: store, in response to a write request input from the at least one external device, write data in one of the first memory and the second memory based on a logical address input along with the write data; and output, to the interconnect device and in response to a read request input from the at least one external device, data read from one of the first and second memories based on a logical address input along with the read request.

The controller can be further configured to: allocate, in response to a second request input from the at least one external device, a memory area in the first memory and the second memory for a logical address range corresponding to the second request; and release, in response to a third request input from the at least one external device, allocation of the memory area in the first memory and the second memory, which is associated with a logical address range corresponding to the third request.

The interconnect device can include at least one input port coupled to the at least one external device; at least one output port coupled to the plural memory devices; and plural PCI-to-PCI bridges (PPB) configured to generate, change, or remove at least one data path between the at least one input port and the at least one output port.

Each of the first memory and the second memory included in the plural memory devices can include at least a part of memory area exclusively allocated to the at least one external device through an interface in the interconnect device.

The first memory or the second memory can include at least one of a dual in-line memory module (DIMM), a memory add-in-card (AIC), or a non-volatile memory. The interconnect device can be configured to support an interface corresponding to an internal configuration of the first memory or the second memory.

In another embodiment of the present disclosure, a method for operating a memory expander can include receiving a first request transmitted through an interconnect device from at least one external device; migrating data from a first logical device to a second logical device in response to an address of the first logical device which is transmitted along with the first request; transmitting, to the at least one external device, an address of a location in which the migrated data is stored within the second logical device; and cutting off power to the first logical device when the first logical device becomes unused by the at least one external device.

The method can further include tracking available memory capacities of the first logical device and the second logical device; and cutting off power to an unused device among the first logical device and the second logical device.

The first logical device and the second logical device can be allocated for storing data corresponding to different logical address ranges.

The method can further include storing, in response to a write request input from the at least one external device, write data in one of the first logical device and the second logical device based on a logical address input along with the write data; and outputting, to the interconnect device and in response to a read request input from the at least one external device, data read from one of the first and second logical devices based on a logical address input along with the read request.

Each of the first logical device and the second logical device can include at least a part of memory area exclusively allocated to the at least one external device through an interface in the interconnect device.

In another embodiment, a memory expander can include plural memories with at least one power supply configured to control power supplied to each of the plural memory devices; and a controller configured to allocate a memory area of the plural memories for a plurality of logical devices, track an available memory capacity of each logical device, and cut off power supplied to an unused logical device among the plurality of logical devices.

The controller can be configured to, in response to a first request input from at least one external device, migrate data from a first logical device to a second logical device, and cut off the power supplied to the first logical device.

The first request can include an address or an identifier indicating the first logical device or the second logical device. The controller can be further configured to notify, after migrating the data to the second logical device, the at least one external device of a location in which the migrated data is stored in the second logical device.

The controller can be further configured to block a notification of the cut-off of the power supplied to the unused logical device when the power supplied to the unused logical device is cut off without any request input from the at least one external device.

In another embodiment of the present disclosure, a memory system can include memory groups, memory spaces of which are respectively indicated by different ranges within a single logical address structure, at least a part of each of the ranges being dynamically allocated to a computing system; and a controller configured to interrupt a power supply to each of the memory groups. Each of the memory groups can include one or more memories. At least one of the memory spaces indicated by the part can be logically accessible by the computing system.

Embodiments of the disclosed technology will now be described with reference to the accompanying drawings, wherein like numbers reference like elements.

FIG. 1 illustrates a first example of data infrastructure according to an embodiment of the present disclosure. Specifically, FIG. 1 illustrates a computing system including a plurality of host systems 102A, 102B and a pooled memory device 110 as the first example of the data infrastructure. The plurality of host systems 102A, 102B and the pooled memory device 110 may be coupled through an interconnect device 180.

The data infrastructure can refer to a digital infrastructure that facilitates data sharing and consumption. Like other infrastructure, data infrastructure can include structures, services, and facilities used for data sharing and consumption. For example, the data infrastructure can include various components or apparatuses including hardware, software, networking, services, policies, and the like that enable data consumption, storage and sharing. The data infrastructure can provide a foundation on which to create, manage, use, and secure data.

For example, the data infrastructure can be divided into a physical infrastructure, an information infrastructure, a business infrastructure, and the like. The physical infrastructure can include data storage devices, data processing devices, input/output networks, data sensor facilities, and the like. The information infrastructure can include data repositories such as business applications, databases, and data warehouses, cloud resources and services including virtualization systems, and virtual services, or the like. Further, the business infrastructure can include business intelligence (BI) systems and analytics tools systems such as big data, artificial intelligence (AI), machine learning (ML), or the like.

The plurality of host systems 102A, 102B can be understood as computing devices such as personal computers, workstations, and the like. For example, the first host system 102A may include a host processor 104, a host memory 106, and a storage device 108. The host processor 104 may perform an operation in response to a user's request, temporarily store data, which is used or generated in the process of performing the operation in the host memory 106, and permanently store the data in the storage device 108 as needed.

When a user performs a task including a lot of computation at a high speed such as an operation or operation related to artificial intelligence (AI), machine learning, big data, etc., the computing device may run out of resources to store data used or generated in the process of performing the task. In order to overcome limitations of the internal resources such as the host memory 106 and the storage device 108 in the first host system 102A, the first host system 102A can use the pooled memory device 110 coupled through the interconnect device 180.

Referring to FIG. 1, the second host system 102B may include the same components as the first host system 102A, but internal components of the second host system 102B may be changed according to an embodiment. In addition, although only two host systems (i.e., a first host system 102A and a second host system 102B) have been described in FIG. 1, more host systems could be connected to the pooled memory device 110 through the interconnect device 180.

According to an embodiment, the interconnect device 180 can support or provide versatility and scalability of resources through the pooled memory device 110 to overcome resource limitations of the plurality of host systems 102A, 102B. For example, interconnect device 180 may include a Compute Express Link (CXL) switch. Herein, the Compute Express Link (CXL) is an interface provided to efficiently utilize different types of devices in high-performance computing systems such as artificial intelligence (AI), machine learning, and big data. When the pooled memory device 110 includes a CXL-based Dynamic Random Access Memory (DRAM) device, the plurality of host systems 102A, 102B can expand their usable memory capacity.

When the interconnect device 180 provides cache coherency, a delay may occur in allowing other processors (e.g., another host system 102B) to use variables and data updated by a specific processor (e.g., host system 102A) in the process of sharing variables and data stored in a specific area. In order to reduce the delay in using the pooled memory device 110, a Compute Express Link (CXL) interface through the interconnect device 180 can allow a memory area of the pooled memory device 110 for different logical address ranges that can be assigned to, and used by, the plurality of host systems 102A, 102B. When each of the plurality of host systems 102A, 102B requests a memory area for logical addresses within a specific range, the pooled memory device 110 can assign the memory area for the logical addresses within the specific range to each of the plurality of host systems 102A, 102B. When the plurality of host systems 102A, 102B use different logical addresses, the plurality of host systems 102A, 102B does not share variables and data corresponding to logical addresses which are used by each of the plurality of host systems 102A, 102B. Each of the plurality of host systems 102A, 102B may use the pooled memory device 110 as a memory expander to overcome resource limitations.

The pooled memory device 110 may include a controller 130 and a plurality of memories 150. The controller 130 coupled to the interconnect device 180 may control the plurality of memories 150. The controller 130 may perform data communication with the interconnect device 180 through a Compute Express Link (CXL) interface. Further, the controller 130 may perform data communication with the plurality of memories 150 through a protocol or interface supported by the plurality of memories 150. According to an embodiment, the controller 130 may distribute data input/output operations transmitted from the plurality of host systems 102A, 102B to the pooled memory device 110 and manage power supplied to the plurality of memories 150 in the pooled memory device 110. For example, the pooled memory device 110 may include at least one power supply, which is an electrical device that supplies electric power to an electrical load (e.g., each of the plurality of memories 150). The controller 130 can control the at least one power supply to supply or cut off power to each of the plurality of memories 150.

Each of the memories included in the plurality of memories 150 may be individually supplied with power. For example, each memory in the plurality of memories 150 may include a memory chip or a memory board. According to an embodiment, each of the plurality of memories 150 can include a dual in-line memory module (DIMM), a memory add-in-Card (AIC), a non-volatile memory module (e.g., SSD) supporting various interfaces/connections (e.g., EDSFF 1U Long (E1 L.), EDSFF 1U Short (E1 S.), EDSFF 3U Long (E3 L.), EDSFF 3U Short (E3 S.), etc.), and the like.

The plurality of memories 150 may be partitioned into a predetermined number of logical devices. According to an embodiment, the number of logical devices and the number of memories may be the same or different. For example, the plurality of memories 150 may be divided into up to 16 logical units. Each logical device may be specified by a logical identifier. The plurality of host systems 102A, 102B may access the memory space in the memory 150 through the logical identifier. The logical identifier may be included in a logical address used by the plurality of host systems 102A, 102B.

A memory area of the pooled memory device 110 may be distributed to the plurality of host systems 102A, 102B, and a size of the distributed memory area may be changed in response to a request from each of the plurality of host systems 102A, 102B. FIG. 1 illustrates a configuration in which the plurality of host systems 102A, 102B are coupled to the pooled memory device 110 through an interconnect device 180, but a memory area of the pooled memory device 110 can be distributed to a virtual machine (VM) or a container. Herein, the container can be understood as a lightweight package that includes application code and dependencies such as programming language runtimes and libraries of a specific version required to run a software service. The container can virtualize an operating system. The container can run anywhere from a private data center to a public cloud or even on developers' personal laptop.

Figure 2:
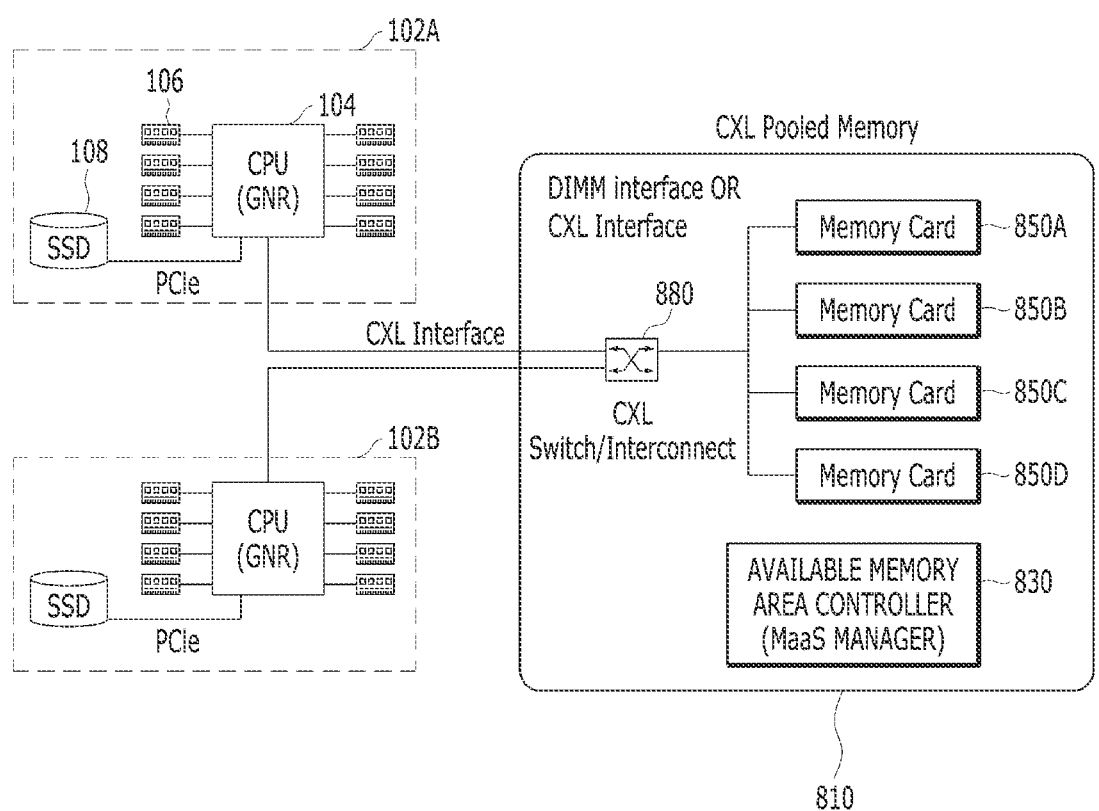
FIG. 2 illustrates a second example of data infrastructure according to another embodiment of the present disclosure.

FIG. 2 illustrates a second example of data infrastructure according to another embodiment of the present disclosure.

Referring to FIG. 2, a computing system including the plurality of host systems 102A, 102B and a pooled memory device 810 will be described. The pooled memory device 810 may include a plurality of memory cards 850A, 850B, 850C, 850D, an interconnect device 880, and an available memory area controller 830.

Each of the plurality of host systems 102A, 102B may include the host processor 104, the host memory 106, and the storage device 108. The host processor 104 and the storage device 108 may exchange data through an interface protocol such as Peripheral Component Interconnect Express (PCIe). According to an embodiment, the host processor 104 and the storage device 108 can perform data communication through various communication standards or interfaces including Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Serial-attached SCSI (SAS), Serial Advanced Technology Attachment (SATA), Mobile Industry Processor Interface (MIPI), and the like.

The plurality of host systems 102A, 102B are coupled to the interconnect device 880 in the pooled memory device 810, and the plurality of host systems 102A, 102B and the pooled memory device 810 can perform data communication through the Compute Express Link (CXL) interface.

A connection way, a data communication method, or a protocol between the interconnect device 880 and the plurality of memory cards 850A, 850B, 850C, 850D may vary according to a configuration of the plurality of memory cards 850A, 850B, 850C, 850D. For example, each of the plurality of memory cards 850A, 850B, 850C, 850D can include a dual in-line memory module (DIMM), a memory add-in-card (AIC), and a non-volatile memory (e.g., SSD) supporting various connections (e.g., EDSFF 1U Long (E1 L.), EDSFF 1U Short (E1 S.), EDSFF 3U Long (E3 L.), EDSFF 3U Short (E3 S.), etc.), and the like. If a first memory card 850A includes a dual in-line memory module (DIMM), the interconnect device 880 and the first memory card 850A can perform data communication through an interface or a protocol used for the dual in-line memory module (DIMM). According to an embodiment, each of the plurality of memory cards 850A, 850B, 850C, 850D may include a logical device capable of performing data communication through a Compute Express Link (CXL) interface. Corresponding to the configuration of the plurality of memory cards 850A, 850B, 850C, 850D, the interconnect device 880 may support at least one interface and protocol for data communication.

The available memory area controller 830 can provide memory areas of the plurality of memory cards 850A, 850B, 850C, 850D in the pooled memory device 810 to an appliance and a cloud level. The available memory area controller 830 uses a Memory as a Service (MaaS), which can provide the memory area as a service at the appliance and the cloud level, to provide the memory areas as utilities. The available memory area controller 830 can provide enormous persistent memory capacity and on-demand memory resources to resource-limited computing devices such as wearable computing devices, mobile computing devices, and/or Internet of Things (IoT) computing devices. Applications executed in the plurality of host systems 102A, 102B, which is a kind of resource-limited computing devices, use a memory service provided by an operating system to access the plurality of memory cards 850A, 850B, 850C, 850D through the available memory area controller 830. Memory areas in the plurality of memory cards 850A, 850B, 850C, 850D could be used like a local memory (e.g., the host memory 106 and the storage device 108) in the plurality of host systems 102A, 102B.

The plurality of host systems 102A, 102B does not have to include a separate control device or an application to borrow, as a local memory, at least some of memory areas of the plurality of memory cards 850A, 850B, 850C, 850D in the pooled memory device 810. The available memory area controller 830 can dynamically provide a memory area requested by each of the plurality of host systems 102A, 102B. For example, a mobile device using the pooled memory device 810 through the Memory as a Service (MaaS) can have a memory capacity of terabytes at an operating system level. An application on a smartphone configured with a local memory of either 128 MB or 256 MB can access a random-access memory of 64 TB, when the smartphone is coupled to a computer network, the Internet, a local memory appliance, or the pooled memory device 810 implementing the MaaS described herein.

Figure 3:
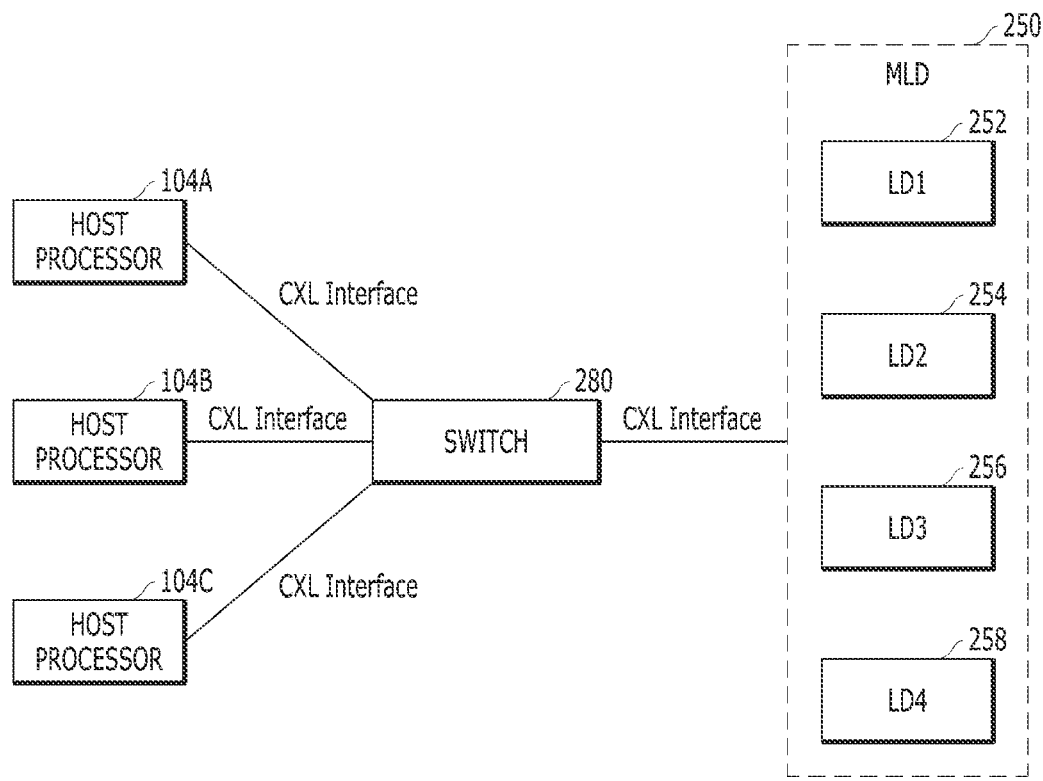
FIG. 3 illustrates a third example of data infrastructure according to another embodiment of the present disclosure.

FIG. 3 illustrates a third example of data infrastructure according to another embodiment of the present disclosure. Specifically, FIG. 3 shows a plurality of host processors 104A, 104B, 104C, a pooled memory device 250, and a switch device 280 coupling the plurality of host processors 104A, 104B, 104C to the pooled memory device 250. According to an embodiment, the switch device 280 may include a Compute Express Link (CXL) switch.

Herein, the Compute Express Link (CXL) may be a dynamic multi-protocol technology designed to support accelerators and memory devices. The CXL can provide a set of protocols including a first CXL protocol (e.g., CXL.io) that includes I/O semantics like PCIe, a second CXL protocol (e.g., CXL.cache) that includes caching protocol semantics, and a third CXL protocol (e.g., CXL.mem) that includes memory access semantics over an individual or on-package link. Semantics can refer to a means for predicting and confirming what action occurs and what the result is in a meaning given by a unit such as an expression, a sentence, and a program code, when a program or application, including a language as a communication system governed by a sentence generation rule in which elements are variously combined, is executed. For example, the first CXL protocol (CXL.io) can be used for search and enumeration, error reporting, and Host Physical Address (HPA) inquiry. The second CXL protocol (CXL.mem) and the third CXL protocol (CXL.cache) may be selectively implemented and used according to a specific accelerator or a memory device usage model. The CXL interface can provide a low-latency, high-bandwidth path for an accelerator to access a system or for a system to access memory coupled to a CXL device.

A Compute Express Link (CXL) switch is a type of interconnect device for coupling the plurality of host processors 104A, 104B, 104C and a plurality of CXL-based devices. For example, the plurality of CXL-based devices may include PCIe-based devices or logical devices (LDs). Here, the Peripheral Component Interconnect Express (PCI Express, PCIe) may refers to a protocol or interface for coupling a computing device and a peripheral device. For example, the PCIe can use a slot or a specific cable to connect the host processor 104, such as a computing device, and the host memory 106 or the storage device 108, such as a peripheral device connected to the computing device, through a plurality of pins (e.g., 18 pins, 32 pins, 49 pins, 82 pins, etc.) and at least one wire (e.g., x1, x4, x8, x16, etc.) over a bandwidth of several hundred MB/s per a wire (e.g., 250 MB/s, 500 MB/s, 984.6250 MB/s, 1969 MB/s, etc.). Based on CXL switching and pooling, multiple host processors 104A, 104B, 104C and multiple devices 252, 254, 256, 258 could be connected to the switch device 280. All or a part of each device connected to the switch device 280 can be allocated as a logical device to different host processors 104A, 104B, 104C. A logical device (LD) can be understood as an entity pointing to a CXL endpoint bound to a virtual CXL switch (VCS). For example, a single logical device (Single SD) includes one logical device (LD), and a multi-logical device (MLD) 250 includes several logical devices (LDs) 252, 254, 256, 258.

For example, a virtual CXL Switch (VCS) may include entities in a physical switch belonging to a single virtual hierarchy (VH). Each entity can be identified using a virtual CXL switch identifier (VCS-ID). The virtual hierarchy (VH) includes a Rendezvous point (RP), a PCI-to-PCI Bridge (PPB), and an end point. The virtual hierarchy VH can include anything that is included below the Rendezvous Point (RP). The structure of the CXL virtual layer might be similar to that of PCIe. Inside the CXL switch included in a fabric manager (FM), the PCI-PCI bridge (PPB) and the ports connected to the PCI-PCI bridge (PPB) can provide connection or block the connection in response to various protocols (PCIe, CXL 1.1, CXL 2.0 SLD or CXL 2.0 MLD). Herein, the fabric manager (FM) can control an aspect of systems related to binding or management of pooled ports and pooled devices. The fabric manager might be a separate entity distinct from the switch or host firmware. Additionally, PCI-PCI Bridges (PPB) belonging to the fabric manager (FM) can provide a data link that includes a traffic from multiple virtual CXL switches (VCSs) or unbound physical ports.

Figure 4:
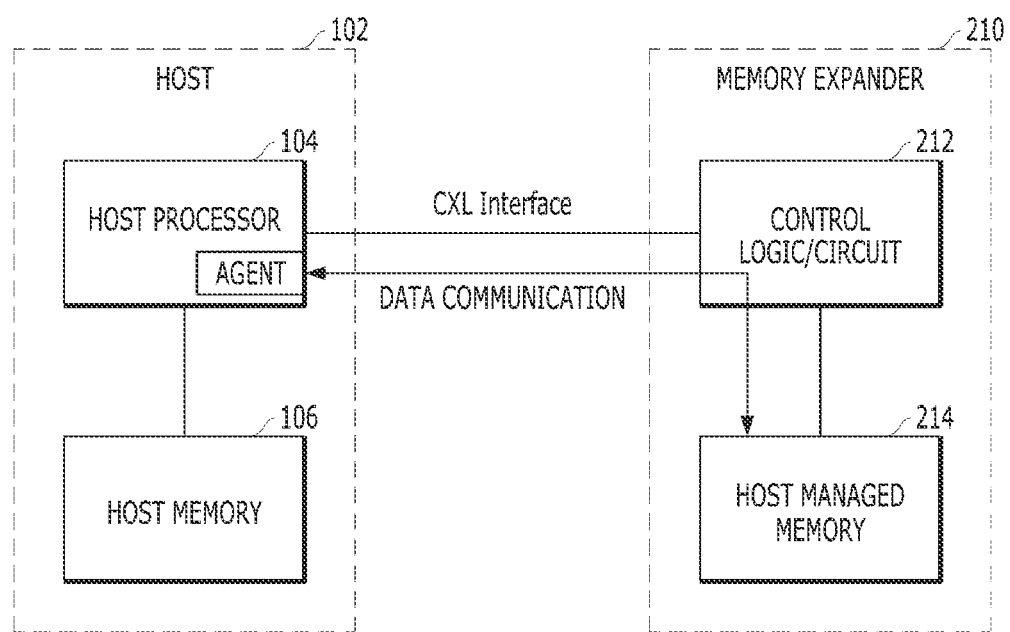
FIG. 4 illustrates a memory expander according to an embodiment of the present disclosure.

FIG. 4 illustrates a memory expander according to an embodiment of the present disclosure.

Referring to FIG. 4, a host computing system 102 may be coupled to a memory expander 210 through a Compute Express Link (CXL) interface. The host computing system 102 may include a host processor 104 and a host memory 106. The memory expander 210 may include a control logic/circuit (or control circuitry) 212 and a host managed memory 214 managed by the host computing system 102.

According to an embodiment, the memory expander 210 may support a first CXL protocol (CXL.io) and a second CXL protocol (CXL.mem). Because the memory expander 210 is not an accelerator, the memory expander 210 might not make any request to the host computing system 102 through a third CXL protocol (CXL.cache). The memory expander 210 can mainly operate through the second CXL protocol (CXL.mem) and process a request input from the host computing system 102. The first CXL protocol (CXL.io) can be mainly used for device discovery, enumeration, error reporting and management. The first CXL protocol (CXL.io) can be used by the memory expander 210 for another I/O specific application use. For example, the control logic 212 can track or monitor whether the host managed memory 214 in the memory expander 210 is used, how much memory area is used by the host computing system 102, or the like through the first CXL protocol (CXL.io).

If the host processor 104 is an entity that requests management information for the memory expander 210, the host computing system 102 may further include an agent as an entity that responds to a request of the host processor 104. For example, the agent may refer to managed devices such as hubs, routers, switches, bridges, and hosts, or S/W-type modules installed in the managed devices. The agent may maintain and manage variables and state information necessary for the host processor 104 to utilize the memory expander 210 in a form of a database. The agent can resolve system-wide consistency for a given address (e.g., a logical address).

According to an embodiment, the memory expander 210 may include a single SD or a multi-logical device MLD. The memory expander 210 supporting the Compute Express Link (CXL) interface can divide the host managed memory 214 into up to 16 separate logical units. Each logical device may be identified by a logical device identifier (LD-ID) used in the first CXL protocol (CXL.io) and the second CXL protocol (CXL.mem). Each logical device may be identified and found in a virtual hierarchy (VH). The control logic 212 for each logical device may control and manage a common transaction and a link layer for each protocol used in each logical device included in the memory expander 210.

Referring to FIGS. 3 and 4, when the memory expander 210 includes a multi-logical device MLD, the memory expander 210 can operate with at least one host computing system 102 through the switch device 280. At this time, at least some of one logical device in the multi-logical device MLD can allocated to the fabric manager (FM). Also, a plurality of logical devices LD #1, LD #2, LD #3, LD #4 included in a multi-logical device MLD may be assigned to at least one host computing system 102. For example, the switch device 280 may manage a plurality of data communication links between the plurality of logical devices LD #1, LD #2, LD #3, LD #4 and a plurality of host computing systems, each including host processors 104A, 104B, 104C, through a plurality of virtual CXL switches VCS included in the switch device 280. Also, a register in switch device 280 may be used to reset at least one logic device LD #1, LD #2, LD #3, LD #4 by at least one host computing system 102. The control logic (or control circuit) 212 in the memory expander 210 can provide access to various architectural functions, controls, and status registers through an application programming interface (API) of the fabric manager (FM). The control logic (or control circuit) 212 can configure a logic device LD #1, LD #2, LD #3, LD #4 included in the multi-logical device MLD, statically or dynamically.

Figure 5:
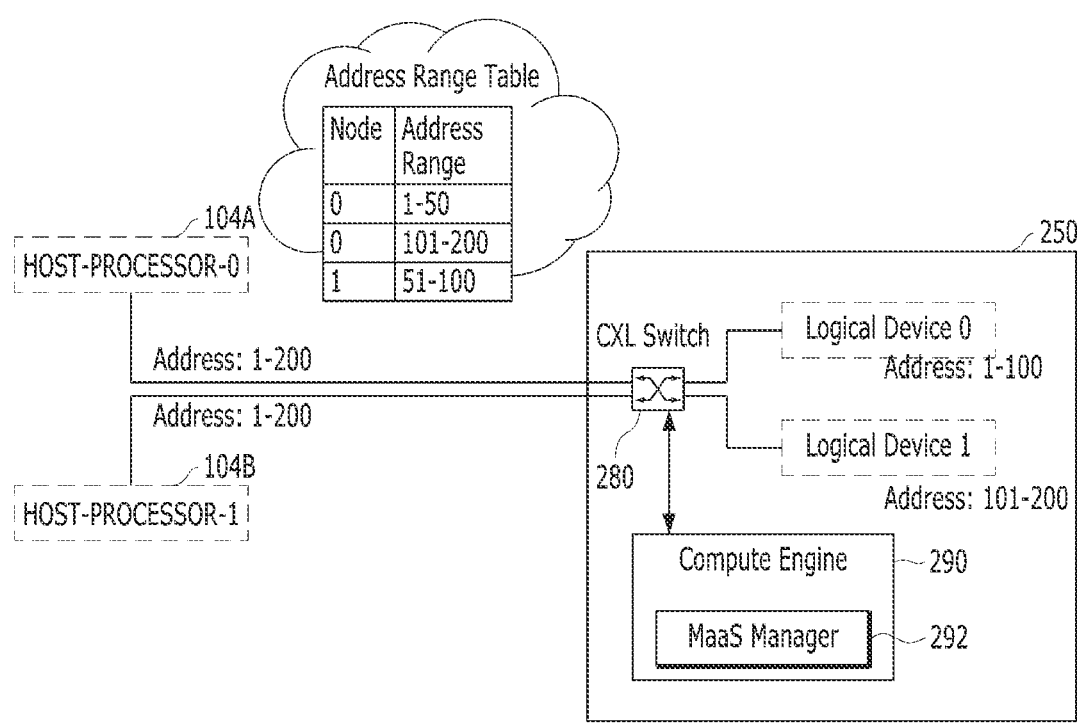
FIG. 5 illustrates a fourth example of data infrastructure according to another embodiment of the present disclosure.

FIG. 5 illustrates a fourth example of data infrastructure according to another embodiment of the present disclosure. FIG. 5 illustrates a data infrastructure in which a plurality of host processors 104A, 104B are coupled to a plurality of logical devices (e.g., Logical Device 0, Logical Device 1) through a switch device 280 in a pooled memory device 250.

According to an embodiment, the pooled memory device 250 coupled to the plurality of host processors 104A, 104B may share logical address information regarding a memory area in the pooled memory device 250 engaged with the plurality of host processors 104A, 104B. For example, the pooled memory device 250 may include a first logical device (Logical Device 0) and a second logical device (Logical Device 1). The memory area of the first logical device (Logical Device 0) can be allocated for storing data corresponding to logical addresses 1 to 100, and the memory area of the second logical device (Logical Device 1) can be allocated for storing data corresponding to logical addresses 101 to 200. The plurality of logical devices in the pooled memory device 250 is used for the logical addresses 1 to 200. The plurality of logical devices can share an ownership with the plurality of host processors 104A, 104B. The ownership can show which one of the host processors 104A, 104B uses the memory areas corresponding to the logical addresses 1 to 200. For example, logical addresses 1 to 50 are assigned to the first host processor 104A, and other logical addresses 51 to 100 are assigned to the second host processor 104B. Further, other logical addresses 101 to 200 are assigned to the first host processor 104A.

A range of logical addresses assigned to each logical device may be different in correspondence to a size of the memory area of the logical device included in the pooled memory device 250. In addition, the memory area allocated to the plurality of host processors 104A, 104B may be released in response to a release request of the plurality of host processors 104A, 104B. In response to an allocation request of the plurality of host processors 104A, 104B, an unallocated memory area in the pooled memory device 250 may be allocated to the corresponding host processor.

The switching device 280 included in the pooled memory device 250 can provide an interface through which the plurality of host processors 104A, 104B may access an allocated memory area within the pooled memory device 250. The memory area corresponding to a range of logical addresses used by the pooled memory device 250 is exclusively allocated to each of the plurality of host processors 104A, 104B. For example, a memory space corresponding to a specific logical address (e.g., logical address 70) may be allocated and used by a single host processor (e.g., either 104A or 104B) instead of plural host processors (e.g., both 104A and 104B).

A control device in the pooled memory device 250 can control ranges of logical addresses used in each of a plurality of logical devices included in the shared memory device 250 as an address range table. The control device can provide the address range table to the plurality of host processors 104A, 104B. Referring to FIGS. 4 and 5, the plurality of host processors 104A, 104B may use a memory area allocated based on the address range table through an agent such as a hypervisor. Herein, the hypervisor can include types of processes that create or run a virtual machine (VM). The hypervisor can include a software system and/or a firmware system that is allowed to run on hardware within specified constraints without emulation.

According to an embodiment, the switch device 280 can interoperate with the computing engine 290. For example, the computing engine 290 may include a fabric manager (FM).

According to an embodiment, the switch device 280 may include a MaaS manager 292 configured to perform data input/output or data migration using the MaaS (Memory as a Service). For example, the MaaS manager 292 may control an address range table indicating whether to use or allocate for ranges of logical addresses used in each of the plurality of logical devices (e.g., Logical Device 0 and Logical Device 1). Further, the MaaS manager 292 can collect information regarding operating states of the plurality of logical devices (e.g., Logical Device 0 and Logical Device 1). For example, the MaaS manager 292 can check the state of the corresponding logical device, before accessing the plurality of logical devices (Logical Device 0, Logical Device 1) based on a memory status map including an address range table or allocating the plurality of logical devices for the plurality of host processors 104A, 104B. Further, the MaaS manager 292 can be configured to associate a virtual memory address (e.g., a logical address for a memory area that is not included in a host computing system) transmitted from the plurality of host processors 104A, 104B into a physical memory address used in the first logical device (Logical Device 0) and the second logical device (Logical Device 1). The MaaS manager 292 can cache data based on address translation.

According to an embodiment, a root complex may be included between the pooled memory device 150 and the plurality of host processors 104A, 104B supporting the Compute Express Link (CXL) interface. The root complex is a type of interface located between the plurality of host processors 104A and 104B and a connection component such as a PCIe bus. The root complex may include several chips, system software, etc. such as several components such as a processor interface and a DRAM interface. The root complex can logically combine hierarchy domains such as PCIe into a single hierarchy. Each fabric instance may include logical devices, switches, bridges, and the like. According to an embodiment, the root complex can calculate a size of memory areas in each logical device and map the memory areas to a system (e.g., an OS, or a file system) to generate an address range table corresponding to the size of the memory areas.

Figure 6:
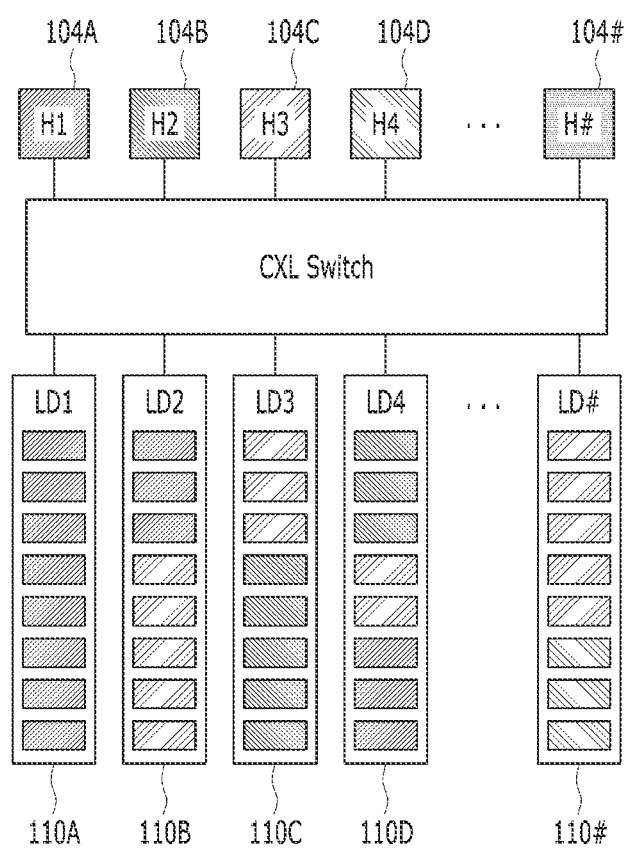
FIG. 6 illustrates a fifth example of data infrastructure according to another embodiment of the present disclosure.

FIG. 6 illustrates a fifth example of data infrastructure according to another embodiment of the present disclosure. FIG. 6 describes a Compute Express Link (CXL) switch and a Compute Express Link (CXL) interface.

According to an embodiment, the CXL switch may connect a plurality of host processors 104A, 104B, 104C, 104D, . . . , 104 # and a plurality of logical devices 110A, 110B, 110C, 110D, . . . , 110 #. A memory area of the plurality of logical devices 110A, 110B, 110C, 110D, . . . , 110# may be allocated exclusively to each of the plurality of host processors 104A, 104B, 104C, 104D, . . . , 104 #. For example, the entire memory area of the first logic device (LD1) 110A may be allocated to and used by the first host processor 104A. A part of the memory area of the second logic device (LD2) 110B may be allocated to the first host processor 104A, and the other part of the memory area of the second logic device (LD2) 110B may be allocated to the third host processor 104C. The third logical device (LD3) 110C may be allocated to and used by the second host processor 104B and the third host processor 104C. The fourth logical device (LD4) 110D may be allocated to, and used by, the first host processor 104A, the second host processor 104B, and the third host processor 104C.

An unallocated memory area in the plurality of logical device 110A, 110B, 110C, 110D, . . . , 110 # may be allocated in response to a request input from the plurality of host processors 104A, 104B, 104C, 104D, . . . , 104 #. In addition, the memory areas allocated to the plurality of host processors 104A, 104B, 104C, 104D, . . . , 104 #can be released in response to a request input from the plurality of host processors 104A, 104B, 104C, 104D, . . . , 104 #.

Figure 7:
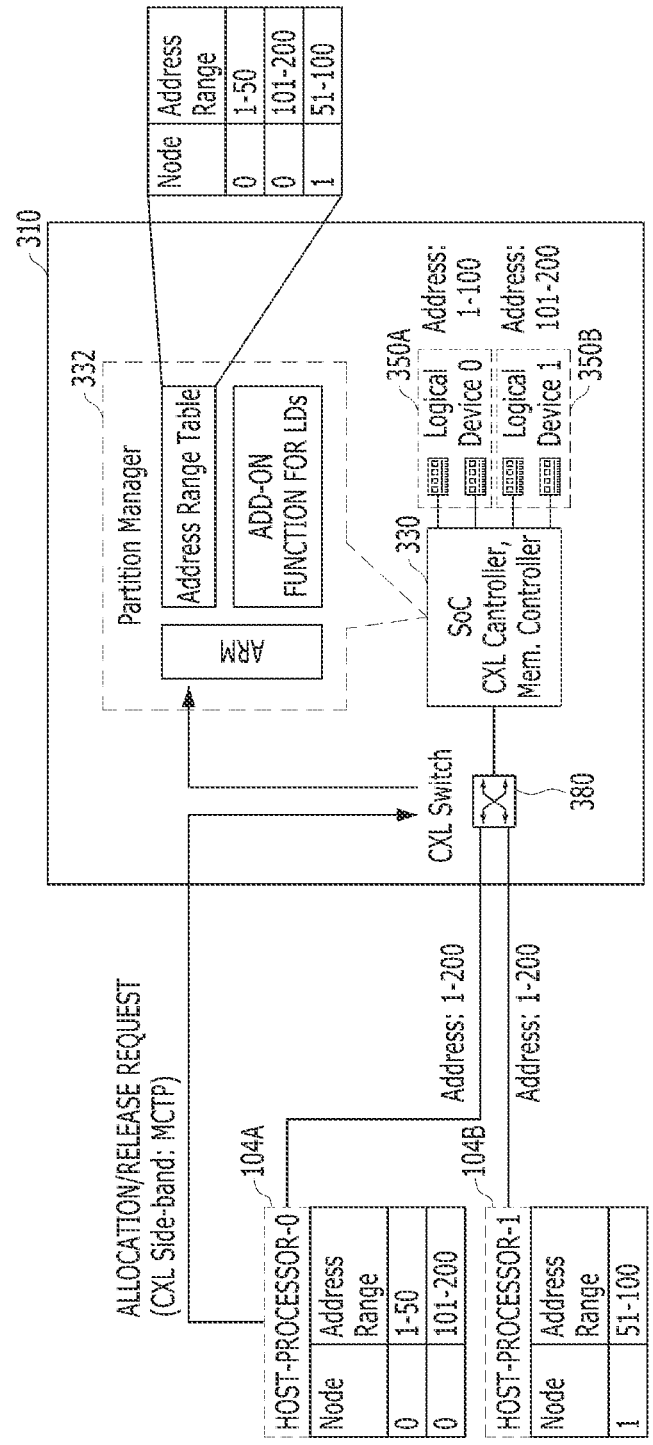
FIG. 7 illustrates a sixth example of data infrastructure according to another embodiment of the present disclosure.

FIG. 7 illustrates a sixth example of data infrastructure according to another embodiment of the present disclosure. Specifically, FIG. 7 illustrates a pooled memory system 310 coupled with a plurality of host processors 104A, 104B. Data communication may be performed between the plurality of host processors 104A, 104B and a plurality of logic devices 350A, 350B in the pooled memory system 310 through a switch device 380. According to an embodiment, the switch device 380 may include an interface for supporting a Compute Express Link (CXL) switch and the plurality of logic devices 350A, 350B.

Referring to FIG. 7, the pooled memory system 310 may include a first logic device 350A, a second logic device 350B, and a controller 330. According to an embodiment, the first logic device 350A or the second logic device 350B may include a dual in-line memory module (DIMM), a memory add-in-card (AIC), a non-volatile memory such as an SSD supporting various connections (e.g., EDSFF 1U Long (E1 L.), EDSFF 1U Short (E1 S.), EDSFF 3U Long (E3 L.), EDSFF 3U Short (E3 S.), etc.), and the like. For example, the first logic device 350A and the second logic device 350B may include a same type of memory. A range of logical addresses corresponding to a memory area capable of storing data may be allocated to the first logic device 350A and the second logic device 350B. For example, logical addresses 1 to 100 may be assigned to the first logical device 350A, and logical addresses 101 to 200 may be assigned to the second logical device 350B. The memory area in the first logical unit 350A and the second logical unit 350B may be allocated exclusively to each of the plurality of host processors 104A, 104B.

Referring to FIGS. 5 and 7, how to control or manage memory areas in the first logic device 350A and the second logic device 350B may be different. In a case of the embodiment described in FIG. 5, whether all logical address ranges corresponding to the memory spaces in the pooled memory device 250 are allocated and used can be shared with the plurality of host processors 104A, 104B. Allocation information regarding the entire logical addresses 1 to 200 corresponding to the memory spaces in the pooled memory device 250 is shared with the plurality of host processors 104A, 104B. On the other hand, in a case of the embodiment described in FIG. 7, the allocation of the entire logical address ranges corresponding to the memory spaces in the pooled memory system 310 might not be shared with the plurality of host processors 104A, 104B. The pooled memory system 310 can notify the first host processor 104A of allocation information regarding logical address ranges (e.g., logical addresses 1 to 50 and 101 to 200) which have been allocated to the first host processor 104A. The second host processor 104B may be notified of another logical address range (e.g., logical addresses 51 to 100) allocated to the second host processor 104B.

The controller 330 in the pooled memory system 310 may include a partition manager 332 that manages and controls partition information regarding the first logic device 350A and the second logic device 350B. The partition manager 332 may manage and control an address range table, which includes allocation information for logical addresses 1 to 200 corresponding to the memory area in the pooled memory device 250. The address range table may include information regarding ownership indicating which host processor uses each of logical address ranges corresponding to all memory spaces in the pooled memory system 310. The partition manager 332 can include a module (e.g., Address Range Manager) configured to manage memory areas in the pooled memory system 310 to be allocated exclusively to the plurality of host processors 104A, 104B using the address range table.

According to an embodiment, the partition manager 332 can include a module that performs an additional function of checking an error in memory areas of the first logical device 350A and the second logical device 350B or checking whether the memory areas are merged. Each of the first logical device 350A and the second logical device 350B may include at least one memory chip, and each memory chip may include a plurality of volatile memory cells or a plurality of non-volatile memory cells. Memory cells in the first logic device 350A and the second logic device 350B may be defective, or erroneously operate, due to various reasons (e.g., Process, Voltage, Temperature (PVT) variations, and the like). If data is stored in a defective memory cell, data safety or reliability might be not secured. Accordingly, the partition manager 332 may recognize a location of the defective memory cell in the first logical device 350A and the second logical device 350B and determine the location as an inaccessible area which is not used to store any data. The partition manager 332 may change sizes of the memory areas in the first logical device 350A and the second logical device 350B in response to the defective memory cell and change a range of logical addresses based on a changed size of the memory areas.

The plurality of host processors 104A, 104B may send a request to the pooled memory system 310 to ask an additional memory area or to release an allocated memory area. The controller 330 in the pooled memory system 310 may change whether to allocate or use memory areas in response to a request input from the plurality of host processors 104A, 104B. The controller 330 can perform data communication with the plurality of host processors 104A, 104B through the switching device 380 in a form of message or packet under a preset protocol.

For example, the plurality of host processors 104A, 104B can transfer Application Programming Interface (API) commands provided by the fabric manager (FM) in a form of MCTP (Management Component Transport Protocol) message via the switch device 380. Here, the MCTP refers to a communication model which can be used for facilitating data communication between a management controller and other management controllers or between a management controller and a management device. This communication model may include message formats, transport descriptions, message exchange patterns, configuration and initialization messages, and the like. The MCTP might be intended to be used for intercommunication between elements or components of a platform management subsystem used in computer systems. The MCTP might be designed to send and receive messages in an MCTP format on various bus types.

Figure 8:
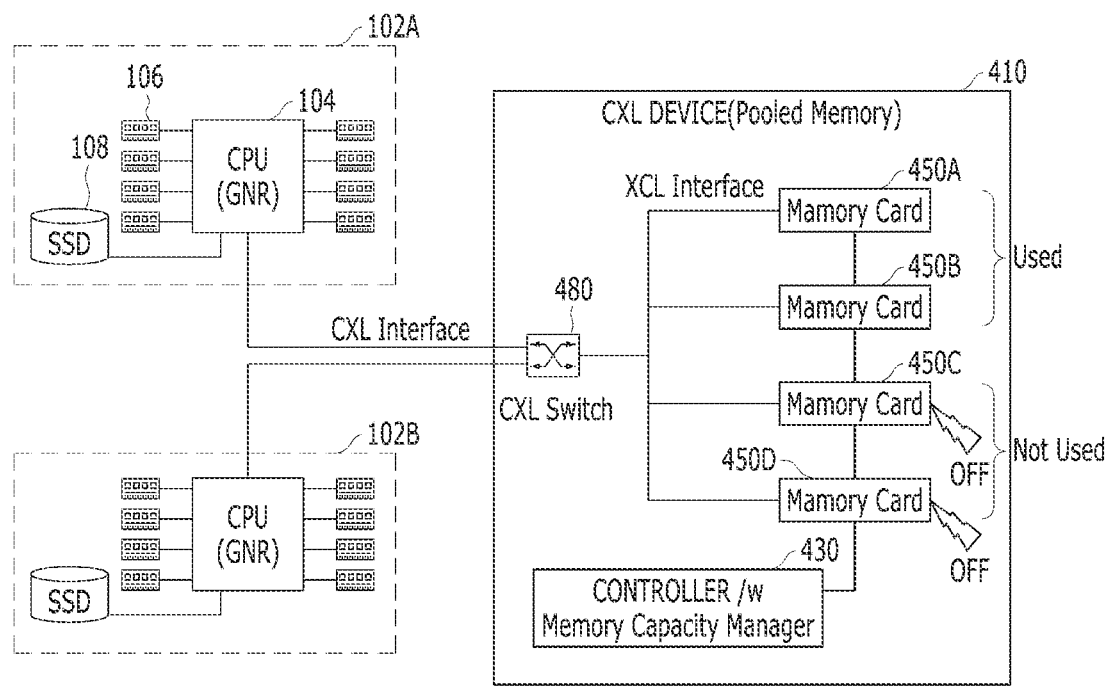
FIG. 8 illustrates a seventh example of data infrastructure according to another embodiment of the present disclosure.

FIG. 8 illustrates a seventh example of data infrastructure according to another embodiment of the present disclosure. Specifically, FIG. 8 illustrates multiple host computing systems 102A, 102B and a pooled memory device 410. According to an embodiment, the pooled memory device 410 may include a switch device 480, a plurality of memory cards 450A, 450B, 450C, 450D, and a controller 430. The switch device 480 may include a Compute Express Link (CXL) switch.

According to an embodiment, the plurality of memory cards 450A, 450B, 450C, 450D may include various types of memory devices. For example, each of the plurality of memory cards 850A, 850B, 850C, 850D can include a dual in-line memory module (DIMM), a memory add-in-card (AIC), and a non-volatile memory (e.g., SSD) supporting various connections (e.g., EDSFF 1U Long (E1 L.), EDSFF 1U Short (E1 S.), EDSFF 3U Long (E3 L.), EDSFF 3U Short (E3 S.), etc.), and the like. Based on an internal configuration of the plurality of memory cards 450A, 450B, 450C, and 450D, configuration of the switch device 480 to providing an interface supporting data communication may vary.

Each of the plurality of host computing systems 102A, 102B can be understood as a computing device such as a personal computer, a workstation, and the like. For example, the first host computing system 102A may include a host processor 104, a host memory 106, and a storage device 108. The host processor 104 may perform an operation in response to a user's request, temporarily store data used or generated in a process of performing the operation in the host memory 106, and permanently store the data in the storage device 108 as needed. The second host computing system 102B may include the same components as the first host computing system 102A, but internal components may be changed according to an embodiment.

Power may be individually supplied or cut off to the plurality of memory cards 450A, 450B, 450C, 450D included in the pooled memory device 410. The plurality of memory cards 450A, 450B, 450C, 450D may be divided into a plurality of logical devices (see FIGS. 3 and 5).

Depending on an embodiment, each of the memory cards 450A, 450B, 450C, 450D may be divided into respective logical devices. Alternatively, one memory card may be divided into a plurality of logical devices, or a plurality of memory cards may be used as a single logical device.

The controller 430 in the pooled memory device 410 may track and monitor whether a plurality of logical devices established in the plurality of memory cards 450A, 450B, 450C, 450D is used. For example, if the first memory card 450A includes a memory area of 100 G, the controller 430 may check memory areas allocated to the plurality of host systems 102A, 102B among the memory area of 100 G. Depending on an embodiment, the controller 430 may track and monitor whether the memory areas allocated to the plurality of host systems 102A, 102B are continuously used or whether the memory areas are not used for a long time after being allocated.

For example, a 5 G area of the 100 G memory space in the third memory card 450C may be allocated or used, and a 50 G area may be allocated or used among the 100 G memory space in the second memory card 450B. Instead of supplying power to the third memory card 450C to use the 5 G area in the third memory card 450C, the controller 430 can move the 5 G area of the third memory card 450C to an unused area within the second memory card 450B. The controller 430 may migrate data stored in the third memory card 450C to the second memory card 450B and change or update mapping information regarding the migrated data or allocation information of the 5 G area. For example, the controller 430 changes the memory area assigned corresponding to addresses 230 to 250 of the third memory card 450C to addresses 160 to 180 of the second memory card 450B in the address range table. After the data migration, because the third memory card 450C is no longer used, the controller 430 may cut off power to the third memory card 450C.

Referring to FIG. 8, among the plurality of memory cards 450A, 450B, 450C, 450D, the first memory card 450A and the second memory card 450B are being used, and the third memory card 450C and the fourth memory card 450B are being not used. The memory card 450D may not be used. The controller 430 may cut off power supplied to the third memory card 450C and fourth memory card 450D which are not used. Through this procedure, power consumption in the pooled memory device 410 can be reduced, as well as resource usage efficiency of data infrastructure can be improved.

Figure 9:
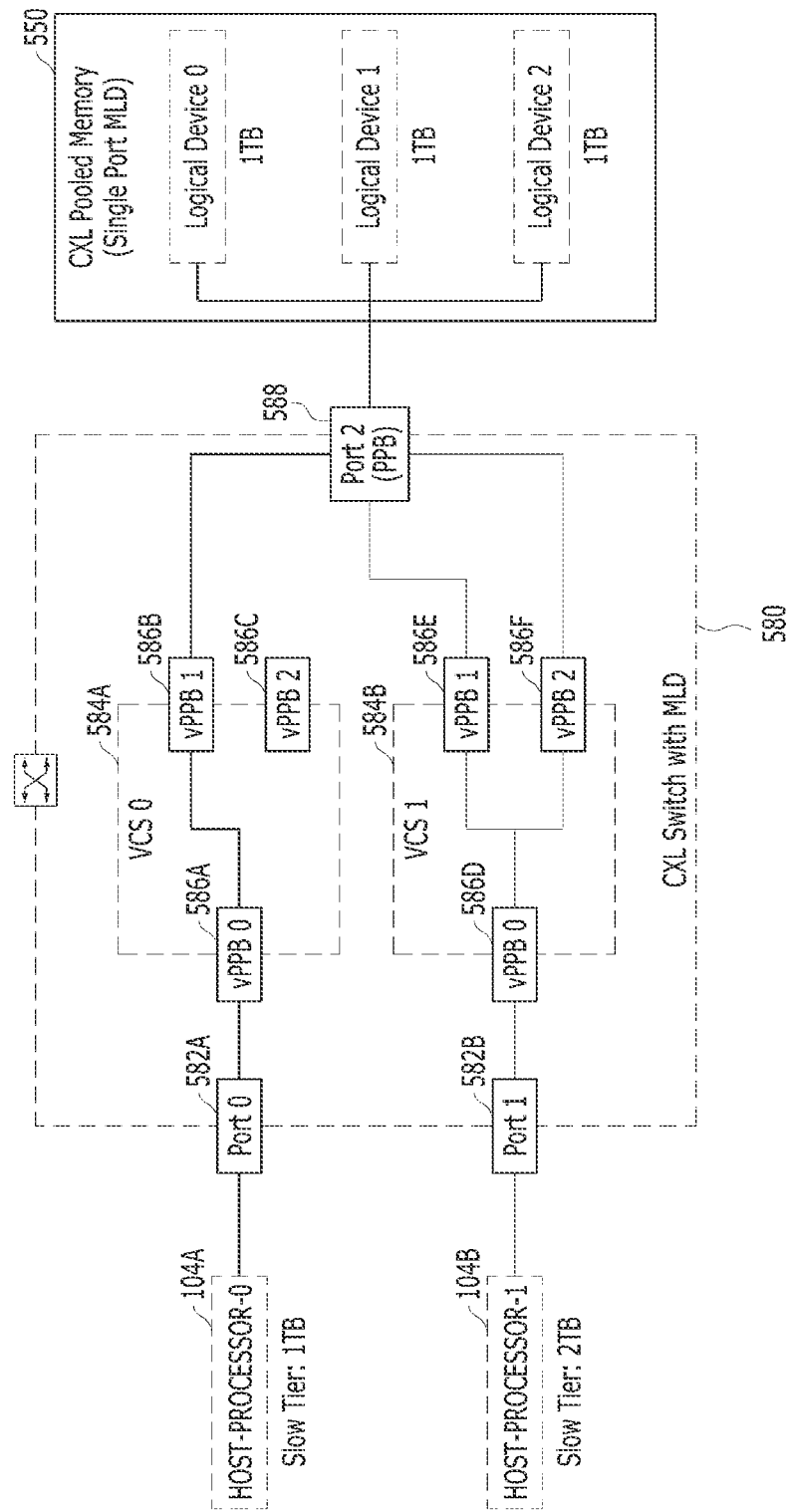
FIG. 9 illustrates an eighth example of data infrastructure according to another embodiment of the present disclosure.

FIG. 9 illustrates an eighth example of data infrastructure according to another embodiment of the present disclosure. Specifically, FIG. 9 illustrates a plurality of host processors 104A, 104B, a multi-logical device 550, and a switch device 580 for connecting the plurality of host processors 104A, 104B and the multi-logic device 550.

According to an embodiment, the switch device 380 may include a Compute Express Link (CXL) switch. The multi-logical device 550 may include first to third logical devices (Logical Devices 0 to 2). Each of the first to third logical devices (Logical Devices 0 to 2) might have a memory space of 1 TB.

The switch device 580 can include at least one input port 582A, 582B connected to at least one host processor 104A, 104B, and at least one output port 588 connected to a plurality of logical devices in the multi-logical device 550, and a plurality of PCI-to-PCI bridges (PPB) 586A, 586B, 586C, 586D, 586E, 586F configured to make, change, or remove at least one data path between at least one input port 582A, 582B and at least one output port 588.

The switch device 580 may include a plurality of virtual CXL switches (VCS) 584A, 584B. For example, the plurality of virtual CXL switches (VCS) 584A, 584B may include at least one upstream port and at least one downstream port. Depending on an embodiment, the plurality of virtual CXL switches (VCS) 584A, 584B may include a plurality of upstream ports and one or more downstream ports. Each downstream port may be bound to a PCI-to-PCI Bridge (PPB) or a virtual PCI-to-PCI Bridge (vPPB). In addition, the switch device 380 may optionally include a fabric manager (FM) for controlling a plurality of virtual CXL switches (VCS) 584A, 584B. The fabric manager (FM) can bind or unbind some of the multiple PCI-to-PCI Bridges (PPB) 586A, 586B, 586C, 586D, 586E, 586F. The fabric manager (FM) can use multiple virtual CXL switches (VCS) 584A, 584B for providing ports of the multi-logical device 550. Each Downstream Switch Port (DSP) can be reassigned to a different Virtual CXL Switch (VCS) via a managed hot-plug flow coordinated by the fabric manager (FM).

Through binding or unbinding of the plurality of PCI-to-PCI bridges (PPB) 586A, 586B, 586C, 586D, 586E, 586F) in the switch device 580, the plurality of host processors 104A, 104B can be coupled to the first to third logical devices (Logical Devices 0 to 2) in the multi-logical device 550. For example, a 1 TB memory area of the first logical device (Logical Device 0) may be allocated to the first host processor 104A, and a 2 TB memory area of second to third logical devices (Logical Devices 1 to 2) may be allocated to the second host processor 104B.

According to an embodiment, the multi-logical device 550 may be partitioned into up to 16 logical devices. As a limitation on the number of subdivided logical devices in the multi-logical device 550, data granularity might increase. Herein, if the data granularity is detailed, overhead may increase in an operation of inputting and storing data. In particular, in object-oriented programming paradigms, the overhead can come from a larger number of objects and method calls or more subroutine calls for procedural programming and parallel computing environments. However, data processing flexibility could increase when each data is subdivided and processed over logical devices.

Figure 10:
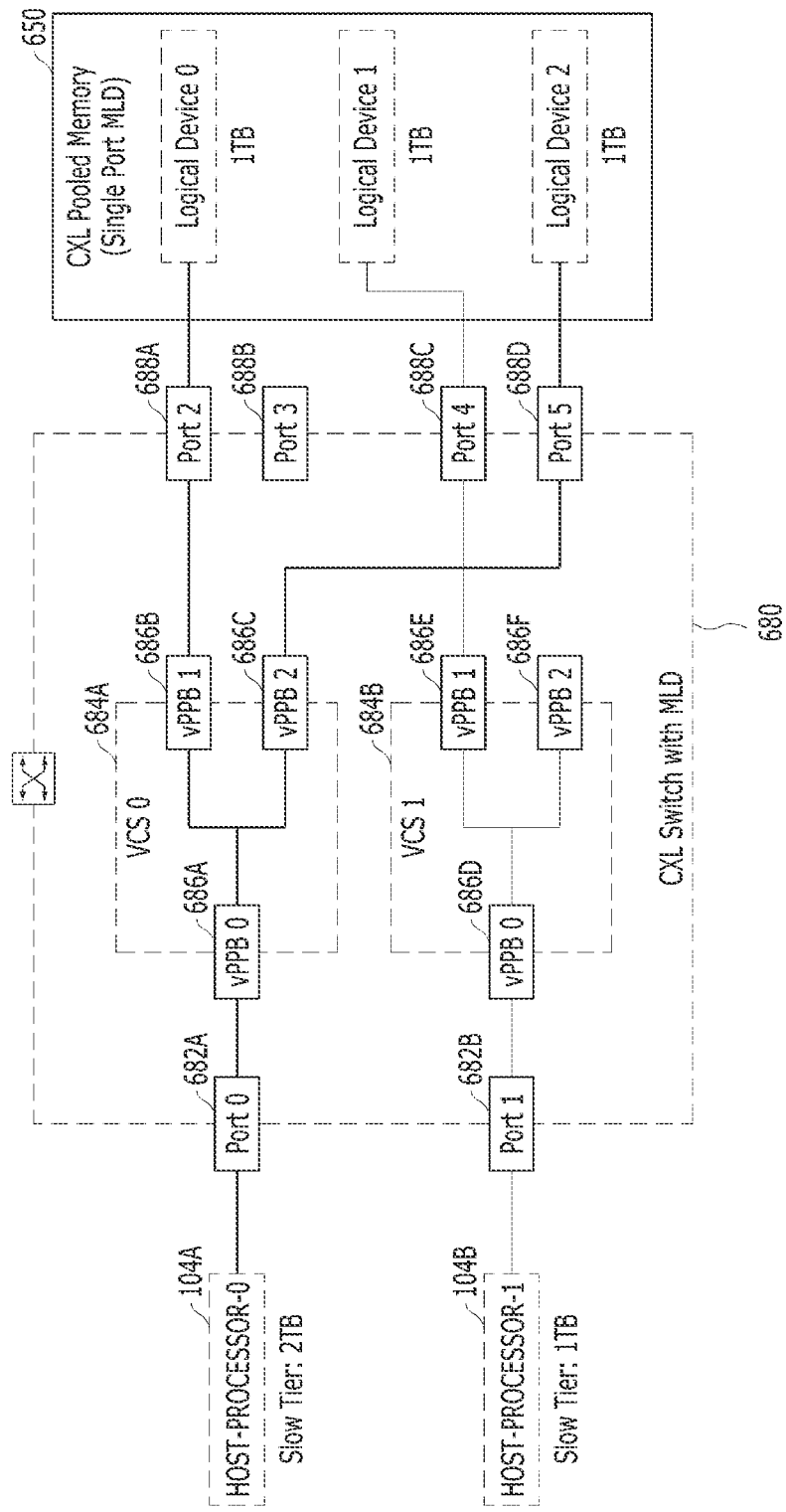
FIG. 10 illustrates a ninth example of data infrastructure according to another embodiment of the present disclosure.

FIG. 10 illustrates a ninth example of data infrastructure according to another embodiment of the present disclosure. Specifically, FIG. 10 illustrates a plurality of host processors 104A, 104B, a multi-logical device 650, and a switch device 680 configured to couple the plurality of host processors 104A, 104B and the multi-logical device 650.

According to an embodiment, the switch device 680 may include a Compute Express Link (CXL) switch. The multi-logical device 550 may include first to third logical devices (Logical Devices 0 to 2). Each of the first to third logical devices (Logical Devices 0 to 2) may have a memory area of 1 TB.

The switch device 680 includes at least one input port 682A or 682B connected to at least one host processor 104A or 104B, at least one output port 688A, 688B, 688C, 688D connected to a plurality of logical devices included in the multi-logic device 550, and a plurality of PCI-to-PCI Bridge (PPB), 686A, 686B, 686C, 686D, 686E, 686F configured to make, change, or remove at least one data path between the at least one input port 682A, 682B and the at least one output port 688A, 688B, 688C, 688D.

The switch device 680 may include a plurality of virtual CXL switches VCS0, VCS1 (684A, 684B). Through binding or unbinding of the plurality of PCI-to-PCI bridges (PPB) 686A, 686B, 686C, 686D, 686E, 686F in the switch device 680, the plurality of host processors 104A, 104B can be coupled to the first to third logical devices (Logical Devices 0 to 2) in the multi-logical device 650. For example, a 2 TB memory area of the first logical device (Logical Device 0) and the third logical device (Logical Device 2) may be allocated to the first host processor 104A. A 1 TB memory area of the second logical device (Logical Device 2) may be allocated to the second host processor 104B. In response to a request of at least one of the host processors 104A, 104B, allocation of the memory area in the multi-logical device 650 may be changed. In response thereto, some of the plurality of PCI-PCI bridges (PPB) 686A, 686B, 686C, 686D, 686E, 686F in the switch device 680 can be bound or unbound.

According to an embodiment, allocation and allocation release regarding the memory area in the multi-logical device 650 may be performed in a unit of logical device connected to respective output ports 688A, 688B, 688C, 688D. In this case, data granularity may increase. However, dynamically changing allocation and usage in the unit of a logical device might induce overheads in an aspect of hot-plugging and disconnection between some of multiple PCI-to-PCI bridges (PPB) 686A, 686B, 686C, 686D, 686E, 686F.

FIG. 11 illustrates a method for operating a memory expander according to another embodiment of the present disclosure.

Referring to FIG. 11, the method for operating the memory expander can include receiving a first request transmitted from at least one host processor through an interconnect device (operation 712), migrating data used in a first logical device to a second logical device in response to an address of a first logical device transmitted together with the first request (operation 714), transferring an address in the second logical unit for migrated data to the at least one host processor (operation 716), and cutting off power supplied to the first logical device (operation 718).

Referring to FIGS. 1 and 6, the first logical device and the second logical device may be allocated for storing data corresponding to different ranges of logical addresses. According to an embodiment, referring to FIG. 5, information indicating whether logical addresses are assigned to memory areas of the first logical device and the second logical device (e.g., the address range table) is shared with the at least one host processor 104A, 104B. Referring to FIG. 7, the pooled memory system 310 including the first logical device and the second logical device can include the controller 330 that controls the address range table regarding the memory areas of the first logical device and the second logical device. According to an embodiment, the pooled memory system 310 can transmit only allocation information regarding an address range assigned to, or used by, the corresponding host processor among the at least one host processor 104A, 104B.

Referring to FIGS. 8 and 11, the controller 430 in the multi-logical device 410 may receive requests transmitted from the plurality of host processors 104A, 104B through the switch device 480. For example, the first host processor 104A may transmit a first request for cutting off the power supplied to the first logical device to the multi-logical device 410 in order to reduce power consumption. Before the controller 430 cuts off the power supplied to the first logical device, valid data stored in the first logical device (e.g., data stored in the memory area currently allocated to and used by the at least one host processor 104A, 104B) can be migrated to the second logical device. The controller 430 may update the address range table or add new mapping information for the migrated data, and then transfer the updated address range table to the at least one host processor 104A, 104B. Thereafter, the controller 430 may cut off power supplied to the first logical device.

The operating method of the memory expander may include tracking available capacities or a currently used memory area of the first logical device and the second logical device and cutting off power supplied to an unused logical device of the first logical device and the second logical device. The controller 430 can control availability or usage of the first logical device and the second logical device in order to efficiently utilize resources and reduce power consumption, even if there is no request transmitted from at least one host processor 104A, 104B. Based on information that keeps track of memory capacity, it is possible to power off a logical device that is not in use.

According to an embodiment, the method of operating the memory expander can further include storing input data in response to a write request of at least one host processor in one of the first logical device and the second logic device, which is selected based on a logical address of the input data, and outputting data stored in one of the first logical device and the second logical device corresponding to the logical address input along with a read request to the interconnect device in response to the read request of the at least one host processor. When at least some portion of the memory area in the first logical unit and the second logical unit in the memory expander is allocated to the at least one host processor, the at least one host processor can transmit a data input/output (I/O) command such as a read command, a write command, and an erase command to the memory expander. The data I/O command could be transferred along with an address corresponding to a memory area that has been allocated. The memory expander may access a specific location in either the first logical device or the second logical device based on the address transmitted along with the data I/O command.

According to an embodiment, cache coherence for the first logical device and the second logical device may be provided to at least one host processor through an interface used by an interconnect device. When the memory expander is connected to at least one host processor and used as a shared memory, data stability of data infrastructure for the at least one host processor could be improved based on the cache coherence for the first logical device and the second logical device.

According to an embodiment, a part or all of the memory areas of the first logical device and the second logical device may be exclusively allocated to at least one host processor through an interface used by an interconnect device. For example, through the switch device 280 shown in FIG. 3, some or all of the memory areas in each of the plurality of logical devices 252, 254, 256, 258 can be exclusively allocated to, and used by, each of the plurality of host processors 104A, 104B, 104C.

According to an embodiment, the operating method of the memory expander may support memory pooling. The memory pooling may refer to operations or processes for pre-allocating and securing memory areas when at least one host processor directly designates a specific size and a number of the memory areas and providing or reclaiming the pre-allocated and secured memory area in response to a call (e.g., new/delete) of the at least one host processor's request. Referring to FIG. 6, memory spaces in the pooled memory device 310 working as the memory expander may additionally allocate an unallocated memory area or release an allocated memory area in response to a request input from the at least one host processor 104A, 104B.

As above described, a memory expander or a pooled memory device according to an embodiment of the disclosure can monitor or track a memory area, which is currently used or unused by at least one host processor or computing system, and cuts off power supplied to an unused memory area, so that power consumption of the memory expander or the pooled memory device could be reduced.

In addition, a memory expander or a pooled memory device according to an embodiment of the disclosure may perform data migration between a plurality of logical devices. The memory expander or the pooled memory device can monitor or track a memory area in plural logical devices, which is used by at least one host processor or computing system. Before cutting off power to at least one logical device to reduce power consumption, the memory expander or the pooled memory device can migrate data stored in the at least one logical device to another logical device and notify the at least one host processor or computing system of data migration which occurred within the plural logical devices. Through these procedures, it is+ possible to increase usage efficiency regarding resources in the memory expander or the pooled memory device.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with an embodiment, the logic recited in the claims may correspond to any one or a combination of the features described herein that perform the recited operations of the logic. Further, in accordance with an embodiment, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof. Furthermore, the embodiments may be combined to form additional embodiments.

The methods, processes, and/or operations described herein may be performed by code or instructions to be executed by a computer, one or more processors, one or more controllers, or other signal processing device(s). The computer, processor(s), controller(s), or other signal processing device(s) may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor(s), controller(s), or other signal processing device(s) which is to execute the code or instructions for performing the method embodiments or operations of the apparatus embodiments herein.

The controllers, processors, control circuitry, circuits, devices, modules, units, data compressors, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, circuits, devices, data compressors, modules, units, multiplexers, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, circuits, devices, modules, units, multiplexers, logic, interfaces, data compressors, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While certain embodiments have been described above, it will be understood to those skilled in the art that the embodiments described are by way of example only. Accordingly, the pooled memory device, the memory expander, and the method for operating a memory expander should not be limited based on the described embodiments. Rather, the pooled memory device, the memory expander, and the method for operating a memory expander described herein should only be limited in light of the claims that follow when taken in conjunction with the above description and accompanying drawings. Furthermore, the embodiments may be combined to form additional embodiments.

What is claimed is:

1. A pooled memory device, comprising:
    a plurality of memory devices including a first memory device and a second memory device with at least one power supply configured to control a power supplied to each of the plural memory devices; and
    a controller coupled to an interconnect device configured to provide, to at least one external device, the plurality of memory devices as plural logical devices, the controller configured to track available memory capacities of the first memory device and the second memory device and cut off the power supplied to an unused memory device among the first memory device and the second memory device,
    wherein the controller is configured to, in response to a first request input from the at least one external device, migrate data from the first memory device to the second memory device and cut off the power supplied to the first memory device,
    wherein the controller is further configured to notify, after migrating the data to the second memory device, the at least one external device of a location in which the migrated data is stored in the second memory device.

2. The pooled memory device according to claim 1, wherein the first request includes an address or an identifier indicating the first memory device or the second memory device.

3. The pooled memory device according to claim 1, wherein the controller is further configured to block a notification of the cut-off of the power supplied to the unused memory device when the power supplied to the unused memory device is cut off without a first request input from the at least one external device.

4. The pooled memory device according to claim 1, wherein the first memory device and the second memory device are allocated for storing data associated with different logical address ranges used for the logical devices.

5. The pooled memory device according to claim 4, wherein the controller is further configured to:
    store, in response to a write request input from the at least one external device, write data in one of the first memory device and the second memory device based on a first logical address input along with the write data; and
    output, to the interconnect device and in response to a read request input from the at least one external device, data read from one of the first and second memory devices based on a second logical address input along with the read request.

6. The pooled memory device according to claim 1, wherein the controller is further configured to:
    allocate, in response to a second request input from the at least one external device, a memory area in the first memory device and the second memory device for a first logical address range corresponding to the second request; and
    release, in response to a third request input from the at least one external device, allocation of the memory area in the first memory device and the second memory device, which is associated with a second logical address range corresponding to the third request.

7. The pooled memory device according to claim 1, wherein the interconnect device comprises:
- at least one input port coupled to the at least one external device;
- at least one output port coupled to the plural memory devices; and
- plural PCI-to-PCI bridges (PPB) configured to generate, change, or remove at least one data path between the at least one input port and the at least one output port.

8. The pooled memory device according to claim 1, wherein each of the first memory device and the second memory device comprises at least a part of memory area exclusively allocated to the at least one external device through an interface in the interconnect device.

9. The pooled memory device according to claim 1,
- wherein the first memory device or the second memory device comprises at least one of a dual in-line memory module (DIMM), a memory add-in-card (AIC), or a non-volatile memory, and
- wherein the interconnect device is configured to support an interface corresponding to an internal configuration of the first memory device or the second memory device.

10. A method for operating a memory expander, the method comprising:
- receiving a first request transmitted through an interconnect device from at least one external device;
- migrating data from a first logical device to a second logical device in response to a first address of the first logical device which is transmitted along with the first request;
- transmitting, to the at least one external device, a second address of a location in which the migrated data is stored within the second logical device; and
- cutting off power to the first logical device when the first logical device becomes unused by the at least one external device.

11. The method according to claim 10, further comprising:
- tracking available memory capacities of the first logical device and the second logical device; and
- cutting off power to an unused logical device among the first logical device and the second logical device.

12. The method according to claim 10, wherein the first logical device and the second logical device are allocated for storing data corresponding to different logical address ranges.

13. The method according to claim 10, further comprising:
- storing, in response to a write request input from the at least one external device, write data in one of the first logical device and the second logical device based on a first logical address input along with the write data; and
- outputting, to the interconnect device and in response to a read request input from the at least one external device, data read from one of the first and second logical devices based on a second logical address input along with the read request.

14. The method according to claim 10, wherein each of the first logical device and the second logical device comprises at least a part of memory area exclusively allocated to the at least one external device through an interface in the interconnect device.

15. A memory expander comprising:
- a plurality of memory devices with at least one power supply configured to control power supplied to each of the plural memory devices; and
- a controller configured to allocate a memory area of the plurality of memory devices for a plurality of logical devices, track an available memory capacity of each logical device, and cut off the power supplied to an unused logical device among the plurality of logical devices,
- wherein the controller is further configured to block a notification of the cut-off of the power supplied to the unused logical device when the power supplied to the unused logical device is cut off without any request input from at least one external device.

16. The memory expander according to claim 15, wherein the controller is configured to, in response to a first request input from the at least one external device, migrate data from a first logical device to a second logical device, and cut off the power supplied to the first logical device.

17. The memory expander according to claim 16,
- wherein the first request includes an address or an identifier indicating the first logical device or the second logical device, and
- wherein the controller is further configured to notify, after migrating the data to the second logical device, the at least one external device of a location in which the migrated data is stored in the second logical device.

* * * * *